(No Model.)
W. P. BROOKS.
FENCE POST.
No. 284,806. Patented Sept. 11, 1883.
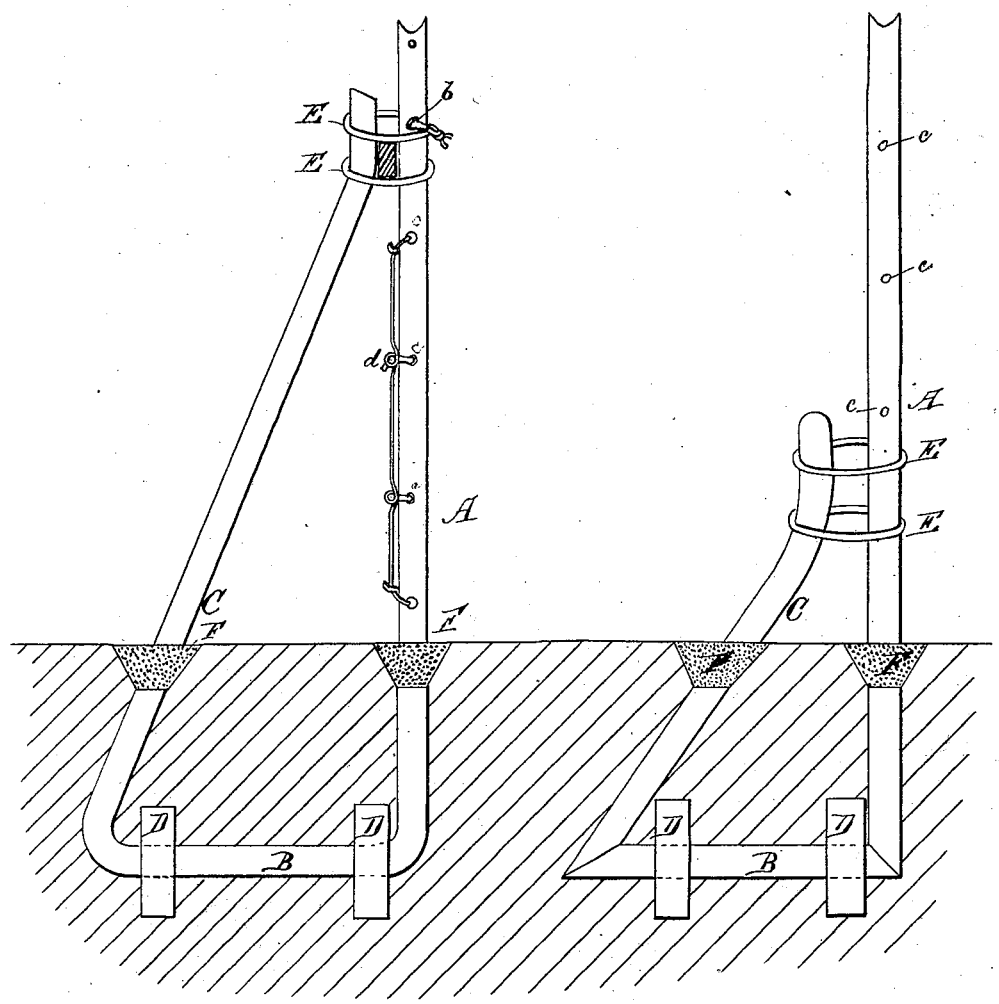

UNITED STATES PATENT OFFICE.

WILLARD P. BROOKS, OF TOPEKA, KANSAS.

FENCE-POST.

SPECIFICATION forming part of Letters Patent No. 284,806, dated September 11, 1883.

Application filed March 29, 1883. (No model.)

*To all whom it may concern:*

Be it known that I, WILLARD P. BROOKS, a citizen of the United States of America, residing at Topeka, in the county of Shawnee and State of Kansas, have invented certain new and useful Improvements in Fence-Posts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in iron fence-posts for wire fences; and it consists in forming a post of tubular or solid rod-iron with a triangular base, and certain devices for securing the wires to said post, by means of which the greatest strength and durability can be obtained, which can be manufactured at a very small cost, and which I will now proceed to describe.

In the annexed drawings, Figure 1 is a side elevation, showing the same in position in the ground. Fig. 2 is a side elevation of a modification of my invention.

Referring to said drawings, A is the upright portion of the post, formed of suitable tubular or solid rod-iron, having the base B bent at right angles to said upright portion A, and the brace-rod C bent upward toward the upright part A.

D D are wood blocks having holes bored through their center, through which the base B is passed before the post is bent, and which serve to hold the post in position when the same is placed in the ground.

E E are wire loops or rings, which are placed over the top of the upright part A and brace-rod C, and serve to hold the same together. The upper loop may be held in place by means of a wire, *b*, passing through a hole in the upper portion of the post A. *c c* are holes in the upright A, by means of which the wires are attached to said post. When desired, the fence-wire can be secured by means of small pieces of wire *d*, passed through said holes and twisted together.

A blind-board can be placed between the loops E, as shown in Fig. 1.

As a modification of my invention, the brace-rod C may be made shorter, as shown in Fig. 2.

F F represent a packing of coal-tar and sand placed around the post on the surface of the ground. This post can be covered with any suitable preparation to prevent rusting.

Having thus fully described my invention, I claim—

An iron fence-post having the upright portion A, base-piece B, and brace-rod C, in combination with the blocks D and loops E, substantially as shown and described.

In testimony whereof I affix my signature in presence of two witnesses.

WILLARD P. BROOKS.

Witnesses:
CHAS. H. FLETCHER,
JAS. R. BARNES.